(12) United States Patent
Yamamoto (10) Patent No.: US 12,233,836 B2
(45) Date of Patent: Feb. 25, 2025

(54) BRAKING CONTROL DEVICE FOR VEHICLE

(71) Applicant: ADVICS CO., LTD., Kariya (JP)

(72) Inventor: Yusaku Yamamoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 311 days.

(21) Appl. No.: 17/758,904

(22) PCT Filed: Jan. 22, 2021

(86) PCT No.: PCT/JP2021/002245
§ 371 (c)(1),
(2) Date: Nov. 18, 2022

(87) PCT Pub. No.: WO2021/149796
PCT Pub. Date: Jul. 29, 2021

(65) Prior Publication Data
US 2023/0219544 A1 Jul. 13, 2023

(30) Foreign Application Priority Data
Jan. 24, 2020 (JP) .................. 2020-009719

(51) Int. Cl.
*B60T 8/26* (2006.01)
*B60T 8/172* (2006.01)
*B60T 8/1755* (2006.01)

(52) U.S. Cl.
CPC .............. *B60T 8/26* (2013.01); *B60T 8/172* (2013.01)

(58) Field of Classification Search
CPC . B60T 8/26; B60T 8/172; B60T 8/175; B60T 8/1755
(Continued)

(56) References Cited

U.S. PATENT DOCUMENTS

2006/0170283 A1* 8/2006 Alvarez ................ B60T 8/1766
303/155
2009/0048753 A1* 2/2009 Ogawa .................. B60T 8/3225
701/79

(Continued)

FOREIGN PATENT DOCUMENTS

JP 2006193075 A 7/2006

OTHER PUBLICATIONS

International Search Report (PCT/ISA/210) with English translation and Written Opinion (PCT/ISA/237) mailed on Mar. 30, 2021, by the Japanese Patent Office as the International Searching Authority for International Application No. PCT/JP2021/002245.

*Primary Examiner* — Manglesh M Patel
(74) *Attorney, Agent, or Firm* — BUCHANAN INGERSOLL & ROONEY PC (57) ABSTRACT

A braking control device includes a braking control unit that controls a braking device, a load reduction amount derivation unit that derives a reduction amount of a load input from a vehicle body to a suspension for a second wheel, and an anti-force derivation unit that derives an anti-lift force. The braking control unit performs posture braking processing of adjusting the second braking force so that the difference between the reduction amount of the load and the anti-lift force is less than or equal to a difference determination value, and adjusting the first braking force so that the vehicle braking force becomes the required value.

4 Claims, 4 Drawing Sheets

(58) Field of Classification Search
USPC .......................................... 701/70, 71, 78, 82
See application file for complete search history.

(56) References Cited

U.S. PATENT DOCUMENTS

| | | | |
|---|---|---|---|
| 2010/0094495 A1* | 4/2010 | Fujimoto | B60L 15/2036 |
| | | | 701/22 |
| 2010/0174453 A1* | 7/2010 | Takahara | B60G 3/20 |
| | | | 701/41 |
| 2011/0098903 A1* | 4/2011 | Ogawa | B60T 8/1706 |
| | | | 701/71 |
| 2013/0245888 A1* | 9/2013 | Kikuchi | B60G 17/06 |
| | | | 701/38 |
| 2015/0032332 A1* | 1/2015 | Kikuchi | B60W 30/025 |
| | | | 701/37 |
| 2019/0106110 A1* | 4/2019 | Yoshida | B60L 7/26 |
| 2020/0094797 A1* | 3/2020 | Shoji | B60W 40/076 |
| 2021/0283969 A1* | 9/2021 | Danielson | B60G 17/0165 |
| 2024/0326761 A1* | 10/2024 | Putz | B60T 8/172 |

* cited by examiner

BRAKING CONTROL DEVICE FOR VEHICLE

TECHNICAL FIELD

The present disclosure relates to a braking control device for a vehicle.

BACKGROUND ART

When the change amount in the front-rear acceleration of the vehicle at the time of stopping is large, the change rate of the pitch angle of the vehicle at the time of stopping becomes high, and an occupant of the vehicle may feel a sense of discomfort. Thus, in the braking control device described in Patent Literature 1, when stopping the vehicle by applying the braking force, the braking force of the vehicle is reduced before the vehicle is stopped. As a result, since the change amount in the front-rear acceleration at the time of stopping can be reduced, the change rate of the posture at the time of stopping is reduced, and the occupant is less likely to feel discomfort.

CITATIONS LIST

Patent Literature

Patent Literature 1: Japanese Unexamined Patent Application Publication No. 2006-193075

SUMMARY

Technical Problems

In recent years, in a case where the braking force is reduced before the vehicle comes to a stop as described above, it is required to further lower the change rate of the posture of the vehicle at the time of stopping.

Solutions to Problems

A braking control device for a vehicle for solving the above problem is applied to a vehicle including a braking device that adjusts a braking force applied to a front wheel and a braking force applied to a rear wheel, in which when the braking force is applied to a first wheel located on a front side in a vehicle advancing direction among the front wheel and the rear wheel, an anti-dive force that is a force that displaces a front portion of a vehicle body in the vehicle advancing direction upward is generated, and when the braking force is applied to a second wheel located on a rear side in the vehicle advancing direction, an anti-lift force that is a force that displaces a rear portion of the vehicle body in the vehicle advancing direction downward is generated. The braking control device includes a load reduction amount derivation unit configured to derive a load reduction amount, which is a reduction amount of an input load from a reference input load due to application of the braking force to the vehicle, such that the load reduction amount increases as a reduction amount of the vehicle braking force, which is the braking force applied to the vehicle, increases in a case where the input load is a load input from the vehicle body to a suspension interposed between the vehicle body and the second wheel and the reference input load is the input load when the braking force is not applied to the vehicle; an anti-force derivation unit configured to derive the anti-lift force such that the anti-lift force increases as a second braking force, which is a braking force applied to the second wheel, increases; and a braking control unit configured to perform a posture braking processing of adjusting the second braking force such that a difference between the load reduction amount and the anti-lift force is less than or equal to a difference determination value, and adjusting a first braking force, which is a braking force applied to the first wheel so that the vehicle braking force becomes a required value of the vehicle braking force when the vehicle braking force is reduced under a situation where the vehicle is decelerated by application of the braking force.

At the time of vehicle braking, the stroke amount of the suspension interposed between the second wheel and the vehicle body is an amount corresponding to the difference between the load reduction amount and the anti-lift force. The "stroke amount" referred to herein is a change amount of a stroke based on a stroke position of the suspension in a state where the vehicle is neither accelerating nor decelerating as in the time of stopping or constant speed traveling.

Here, when the stroke amount of the suspension changes with the change in the braking force, the vertical movement of the vehicle body occurs due to the change in the stroke amount. In addition, a change in the pitch angle of the vehicle body occurs due to a difference between a change amount in the stroke amount of the suspension interposed between the first wheel and the vehicle body and a change amount in the stroke amount of the suspension interposed between the second wheel and the vehicle body.

Therefore, when the vehicle stops in a state where the stroke amount of the suspension is large, the restoring force of the suspension is large, and thus the change rate of the posture of the vehicle body at the time of stopping tends to become high. In other words, the change rate of the posture of the vehicle body at the time of stopping can be reduced by reducing the stroke amount of the suspension at the time of stopping.

According to the above configuration, when the vehicle braking force is reduced under a situation where the vehicle is decelerated by the application of the braking force, the posture braking processing is performed. When the posture braking processing is performed, the second braking force is adjusted so that the difference between the load reduction amount and the anti-lift force is less than or equal to the difference determination value. As a result, the stroke amount of the suspension interposed between the second wheel and the vehicle body at the time of stopping can be reduced as compared with a case where the vehicle is stopped in a state where the difference is larger than the difference determination value. As a result, a change in the posture of the vehicle body at the time of stopping is suppressed. Therefore, according to the configuration described above, the change rate of the posture of the vehicle body at the time of stopping can be lowered.

In the posture braking processing, the first braking force applied to the first wheel is adjusted so that the vehicle braking force becomes the required value thereof. Therefore, the front-rear acceleration of the vehicle can be prevented from deviating from the target value due to the execution of the posture braking processing.

DESCRIPTION OF EMBODIMENTS

Hereinafter, one embodiment of a braking control device for a vehicle will be described with reference to FIGS. 1 to 6.

Figure 1:
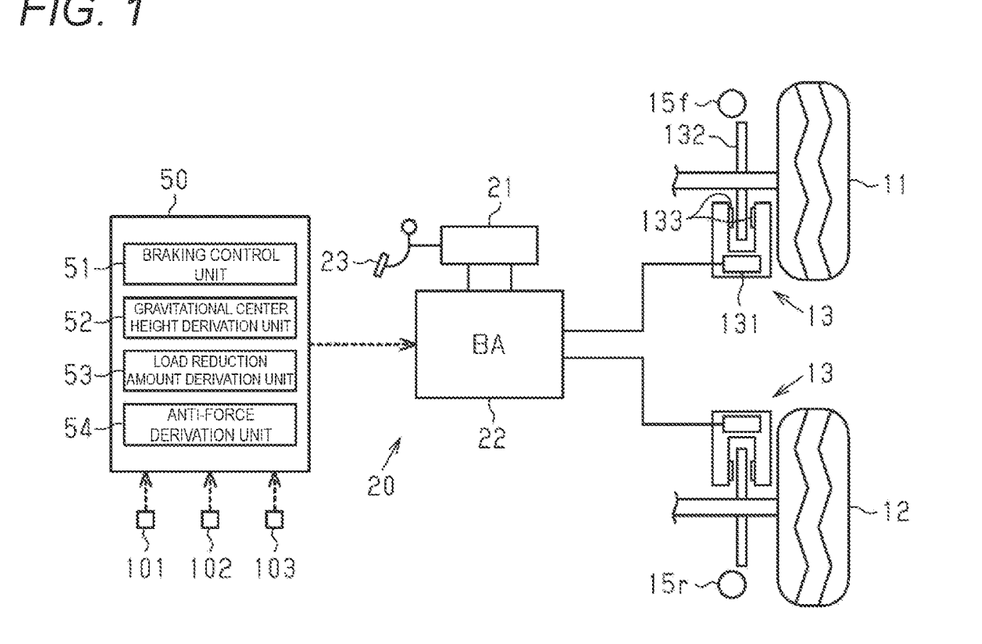
FIG. 1 is a diagram showing a functional configuration of a braking control device for a vehicle according to an embodiment and a schematic configuration of a vehicle equipped with the braking control device.

FIG. 1 illustrates a schematic configuration of a vehicle equipped with a braking control device 50 according to the present embodiment. As illustrated in FIG. 1, braking force is applied to a front wheel 11 and a rear wheel 12 of the vehicle by the actuation of a braking mechanism 13. Each braking mechanism 13 is configured such that the force of pressing a friction material 133 against a rotating body 132 rotating integrally with the wheels 11, 12 increases as the WC pressure, which is the hydraulic pressure in the wheel cylinder 131, increases. Therefore, each braking mechanism 13 can apply a larger braking force to the wheels 11 and 12, the higher the WC pressure. In the following description, the braking force applied to the front wheel 11 may be referred to as "front wheel braking force BPf", and the braking force applied to the rear wheel 12 may be referred to as "rear wheel braking force BPr".

The braking mechanism 13 may be, for example, a disc brake. In this case, the disk rotor corresponds to the "rotating body 132", and the pad corresponds to the "friction material 133". The braking mechanism 13 may be a drum brake. In this case, the drum corresponds to the "rotating body 132", and the shoe corresponds to the "friction material 133".

The braking device 20 of the vehicle includes a hydraulic pressure generation device 21 and a braking actuator 22 to which brake fluid is supplied from the hydraulic pressure generation device 21. In the hydraulic pressure generation device 21, the hydraulic pressure corresponding to the braking operation amount that is the operation amount of the braking operation member 23 by the driver of the vehicle is generated. The braking operation member 23 may be, for example, a brake pedal. The braking actuator 22 is connected to each wheel cylinder 131. Therefore, when the braking operation member 23 is operated, the brake fluid of an amount corresponding to the operation amount is supplied to each wheel cylinder 131. That is, the braking force is applied to each of the wheels 11 and 12. The actuation of the braking actuator 22 can be controlled by the braking control device 50. The front wheel braking force BPf and the rear wheel braking force BPr can be controlled individually by controlling the braking actuator 22 by the braking control device 50.

Figure 2:
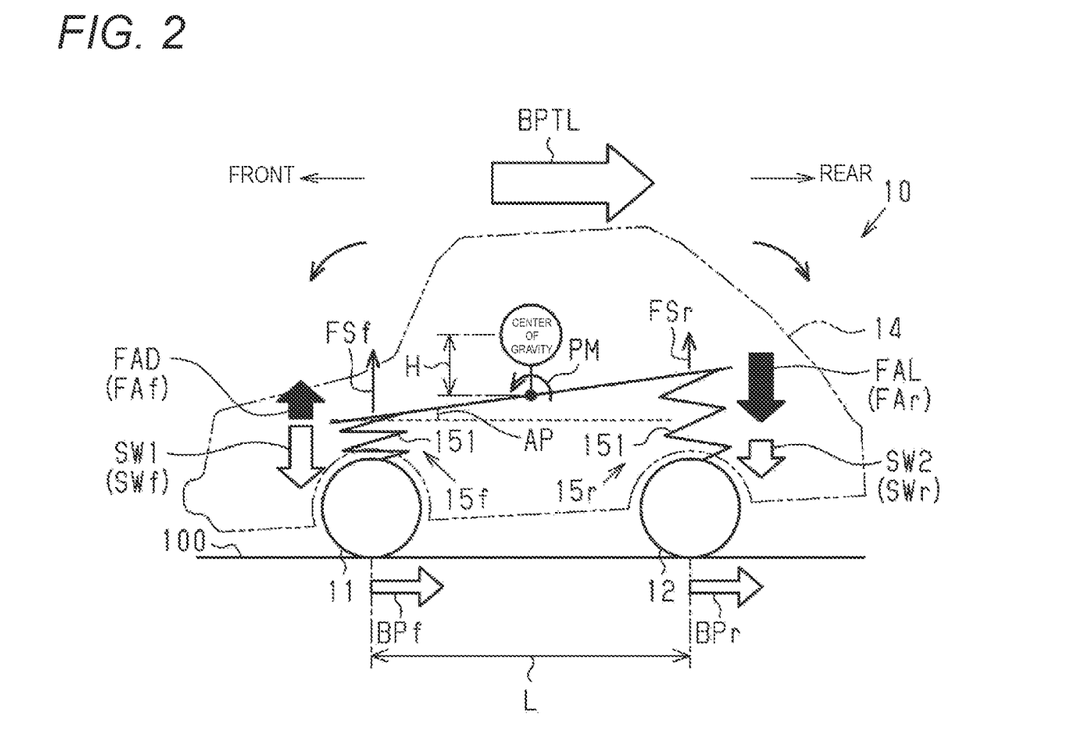
FIG. 2 is an operation diagram schematically illustrating a state in which a braking force is applied to a vehicle traveling forward.

As illustrated in FIGS. 1 and 2, a suspension 15f for the front wheel 11 is interposed between the vehicle body 14 and the front wheel 11 of the vehicle 10. A suspension 15r for the rear wheel 12 is interposed between the vehicle body 14 and the rear wheel 12. Each of the suspensions 15f, 15r includes a spring 151.

Next, pitching motion of the vehicle 10 at the time of vehicle braking will be described with reference to FIG. 2. In FIG. 2, the sprung load SWf on the front wheel 11 side and the sprung load SWr on the rear wheel 12 side are represented by white arrows. The sprung load is a load in a vertical direction input to the suspension from the vehicle body 14 by the vehicle weight and the pitching moment PM. The vertical direction here is a direction orthogonal to the road surface 100 on which the vehicle 10 travels.

As illustrated in FIG. 2, when the vehicle 10 decelerates due to application of the braking force BPTL to the vehicle 10 traveling forward, a pitching moment PM as indicated by a solid arrow in FIG. 2 is generated in the vehicle 10, and the vehicle body 14 performs a pitching motion toward the nose dive side. The nose dive is a behavior of the vehicle for displacing the front portion of the vehicle body 14 in the vehicle advancing direction downward and displacing the rear portion of the vehicle body 14 in the vehicle advancing direction upward. On the other hand, the behavior of the vehicle 10 for displacing the front portion of the vehicle body 14 in the vehicle advancing direction upward and displacing the rear portion of the vehicle body 14 in the vehicle advancing direction downward is referred to as "nose lift". When the vehicle 10 travels forward and the vehicle body 14 performs the pitching motion toward the nose dive side, the front portion of the vehicle body 14 is displaced downward, so that the pitch angle AP of the vehicle 10 increases. On the other hand, when the vehicle 10 travels rearward and the vehicle body 14 performs the pitching motion toward the nose dive side, the front portion of the vehicle body 14 is displaced upward, so that the pitch angle AP of the vehicle 10 decreases.

FIG. 2 illustrates a state in which the vehicle 10 travels forward. When the vehicle 10 travels forward in this manner, out of the front wheel 11 and the rear wheel 12, the front wheel 11 corresponds to a first wheel which is a wheel located on the front side in the vehicle advancing direction, and the rear wheel 12 corresponds to a second wheel which is a wheel located on the rear side in the vehicle advancing direction. The front wheel braking force BPf corresponds to the "first braking force", and the rear wheel braking force BPr corresponds to the "second braking force".

When deceleration is generated by the application of the braking force BPTL when the vehicle 10 travels forward, the sprung load SWf on the front wheel 11 side, which is the sprung load SW1 on the first wheel side, increases, so that the spring 151 of the suspension 15f for the front wheel 11 contracts, and the vehicle body 14 performs the pitching motion toward the nose dive side. As a result, as indicated by a solid arrow in FIG. 2, the front-wheel spring restoring force FSf that is the restoring force of the spring 151 is applied to the vehicle body 14. When deceleration is generated by the application of the braking force BPTL when the vehicle 10 travels forward, the sprung load SWr on the rear wheel 12 side, which is the sprung load SW2 on the second wheel side, reduces, so that the spring 151 of the suspension 15f for the rear wheel 12 extends, and the vehicle body 14 performs the pitching motion toward the nose dive side. As a result, as indicated by a solid arrow in FIG. 2, the rear-wheel spring restoring force FSr that is the restoring force of the spring 151 is applied to the vehicle body 14.

In addition, the anti-dive force FAD and the anti-lift force FAL can be generated in the vehicle 10 as indicated by black arrows in FIG. 2. The anti-dive force FAD is a force generated by applying a braking force to the first wheel of the front wheel 11 and the rear wheel 12, and is a force that displaces the front portion of the vehicle body 14 in the vehicle advancing direction upward. The anti-lift force FAL is a force generated by applying a braking force to the second wheel of the front wheel 11 and the rear wheel 12, and is a force that displaces the rear portion of the vehicle body 14 in the vehicle advancing direction downward. In a case where the vehicle 10 travels forward as illustrated in FIG. 2, when the braking force is applied to the front wheel 11, the anti-dive force FAD is generated, and when the braking force is applied to the rear wheel 12, the anti-lift force FAL is generated. The anti-dive force FAD increases as the braking force applied to the first wheel increases, and the anti-lift force FAL increases as the braking force applied to the second wheel increases.

Of the anti-lift force FAL and the anti-dive force FAD, the force generated by the application of the braking force to the front wheel 11 is referred to as "front wheel side suppression force FAf", and the force generated by the application of the braking force to the rear wheel 12 is referred to as "rear wheel side suppression force FAr". In this case, the front wheel side suppression force FAf and the rear wheel side suppression force FAr can be derived using the following relational expressions (Equation 1) and (Equation 2). When the vehicle 10 travels forward, the front wheel side suppression force FAf corresponds to the anti-dive force FAD, and the rear wheel side suppression force FAr corresponds to the anti-lift force FAL.

[Equation 1]

$$FAf = BPf \cdot \tan \theta f \quad \text{(Formula 1)}$$

$$FAr = BPr \cdot \tan \theta r \quad \text{(Formula 2)}$$

Figure 3:
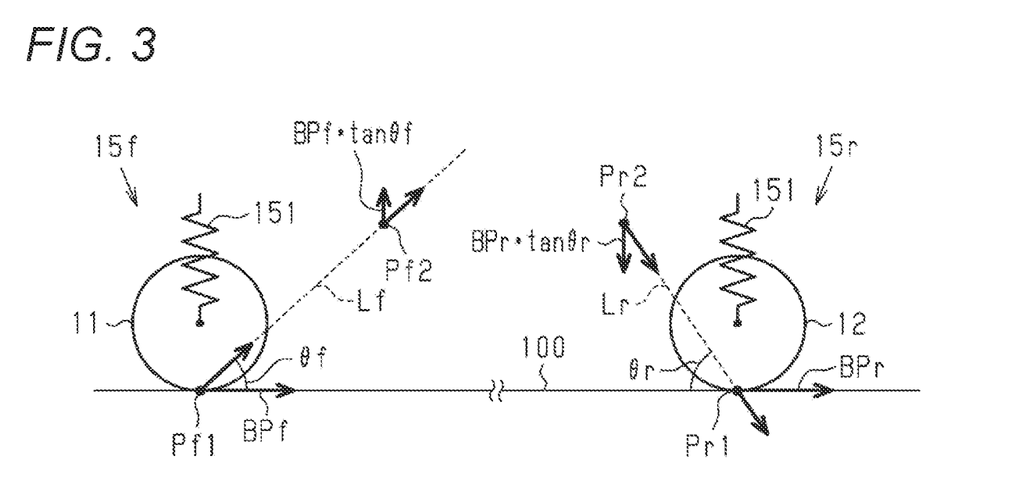
FIG. 3 is a schematic diagram for explaining a front wheel side suppression force and a rear wheel side suppression force.

The angles $\theta f$, $\theta r$ in the relational expressions (Equation 1) and (Equation 2) are angles indicated in FIG. 3. When a point at which the braking force BPf acts on the front wheel 11 is a braking action point Pf1 and the rotation center of the suspension 15f for the front wheel 11 is a center point Pf2, an angle formed by a straight line Lf connecting the braking action point Pf1 and the center point Pf2 and the road surface 100 corresponds to the angle $\theta f$. When a point at which the braking force BPr acts on the rear wheel 12 is a braking action point Pr1 and the rotation center of the suspension 15r for the rear wheel 12 is a center point Pr2, an angle formed by a straight line Lr connecting the braking action point Pr1 and the center point Pr2 and the road surface 100 corresponds to the angle $\theta r$. Note that the angles $\theta f$ and $\theta r$ are angles determined from the specifications of the vehicle 10.

When the vehicle 10 is decelerating due to the application of the braking force BPTL to the vehicle 10, the sprung load SW1 on the first wheel side of the front wheel 11 and the rear wheel 12 increases, while the sprung load SW2 on the second wheel side reduces, When the vehicle 10 travels forward, the sprung load SWf on the front wheel 11 side corresponds to the sprung load SW1, and the sprung load SWr on the rear wheel 12 side corresponds to the sprung load SW2. When the sprung load SW1 increases, the dive force FD, which is a force for contracting the spring of the suspension for the first wheel, increases.

Furthermore, when the sprung load SW2 reduces, the lift force FL, which is a force for extending the spring of the suspension for the second wheel, increases. The dive force FD and the lift force FL can be derived using the following relational expressions (Equation 3) and (Equation 4). In the relational expressions (Equation 3) and (Equation 4), "L" is the wheelbase length of the vehicle 10, and "H" is the gravitational center height of the vehicle 10. Furthermore, "BPTL" is the braking force applied to the vehicle 10, and is the sum of the braking forces applied to the wheels 11 and 12. According to the relational expressions (Equation 3) and (Equation 4), the dive force FD and the lift force FL increase as the vehicle braking force BPTL increases.

[Equation 2]

$$FD = (BPTL \cdot H)/L \quad \text{(Formula 3)}$$

$$FL = (BPTL \cdot H)/L \quad \text{(Formula 4)}$$

When the braking force BPTL is applied to the vehicle 10, the contraction amount, that is, the stroke amount of the spring of the suspension for the first wheel increases as the difference between the dive force FD and the anti-dive force FAD increases. In addition, the extension amount, that is, the stroke amount of the spring of the suspension for the second wheel increases as the difference between the lift force FL and the anti-lift force FAL increases.

Next, the control configuration of the vehicle will be described with reference to FIG. 1.

Detection signals from various sensors are input to the braking control device 50. Examples of the sensor include a stroke sensor 101, a wheel speed sensor 102 and an acceleration sensor 103. The stroke sensor 101 detects a braking operation amount X which is an operation amount of the braking operation member 23, and outputs a signal corresponding to the detection result as a detection signal. The wheel speed sensor 102 detects the wheel speed VW which is the speed of the wheels 11 and 12, and outputs a signal corresponding to the detection result as a detection signal. In the braking control device 50, the vehicle body speed VS, which is the speed of the vehicle 10, is derived based on the wheel speed VW of at least one of the wheels 11 and 12. The acceleration sensor 103 detects a front-rear acceleration Gx which is the acceleration in the longitudinal or front-rear direction of the vehicle 10, and outputs a signal corresponding to the detection result as a detection signal.

The braking control device 50 may have any one of the following configurations (a) to (c).

(a) The braking control device 50 includes one or more processors that execute various processing according to a computer program. The processor includes a CPU and memories such as a RAM and a ROM. The memory stores a program code or a command configured to cause the CPU to execute processing. The memory, that is, the computer-readable medium, includes any available medium that can be accessed by a general-purpose or dedicated computer.

(b) The braking control device 50 includes one or more dedicated hardware circuits that execute various processing. Examples of the dedicated hardware circuit include, for example, an application-specific integrated circuit, that is, an ASIC or an FPGA. The ASIC is an abbreviation for "Application Specific Integrated Circuit", and the FPGA is an abbreviation for "Field Programmable Gate Array".

(c) The braking control device 50 includes a processor that executes some of the various processing in accordance with a computer program, and a dedicated hardware circuit that executes the remaining processing of the various processing.

The braking control device 50 includes, as functional units, a braking control unit 51, a gravitational center height derivation unit 52, a load reduction amount derivation unit 53, and an anti-force derivation unit 54.

The braking control unit 51 controls the front wheel braking force BPf and the rear wheel braking force BPr by operating the braking actuator 22 of the braking device 20.

Specific processing contents for when actuating the braking actuator 22 will be described later.

The gravitational center height derivation unit 52 derives the gravitational center height H of the vehicle 10. A specific processing content when deriving the gravitational center height H will be described later.

The load reduction amount derivation unit 53 derives a reduction amount ΔSW of the sprung load SW2 on the second wheel side. The reduction amount ΔSW here is a reduction amount from the reference input load of the sprung load SW2 due to the application of the braking force BPTL to the vehicle 10, the reference input load being the sprung load SW2 when the braking force BPTL is not applied to the vehicle 10. When the vehicle 10 travels forward, the load reduction amount derivation unit 53 derives the reduction amount ΔSW of the sprung load SWr with the sprung load SWr for the rear wheel 12 as an "input load" input from the vehicle body 14 to the second wheel. The sprung load SWr is a force that contracts the spring of the suspension 15r for the rear wheel 12. When the sprung load SWr reduces, the amount of extension of the spring of the suspension 15r increases as the reduction amount ΔSW increases. That is, the reduction amount ΔSW of the sprung load SWr can be said to be a force that extends the spring of the suspension 15r, that is, the lift force FL. Therefore, in the present embodiment, the load reduction amount derivation unit 53 derives the lift force FL as the reduction amount ΔSW. The lift force FL can be derived by using the above relational expression (Equation 4). When the vehicle 10 travels forward, the load reduction amount derivation unit 53 derives the lift force FL as the reduction amount ΔSW of the sprung load SWr on the rear wheel 12 side. When the vehicle 10 travels backward, the load reduction amount derivation unit 53 derives the lift force FL as the reduction amount ΔSW of the sprung load SWf on the front wheel 11 side.

The anti-force derivation unit 54 derives the anti-dive force FAD. That is, when the vehicle 10 travels forward, the anti-force derivation unit 54 derives the rear wheel side suppression force FAr as the anti-dive force FAD by using the above relational expression (Equation 2). On the other hand, when the vehicle 10 travels backward, the anti-force derivation unit 54 derives the front wheel side suppression force FAf as the anti-dive force FAD by using the above relational expression (Equation 1).

Figure 4:
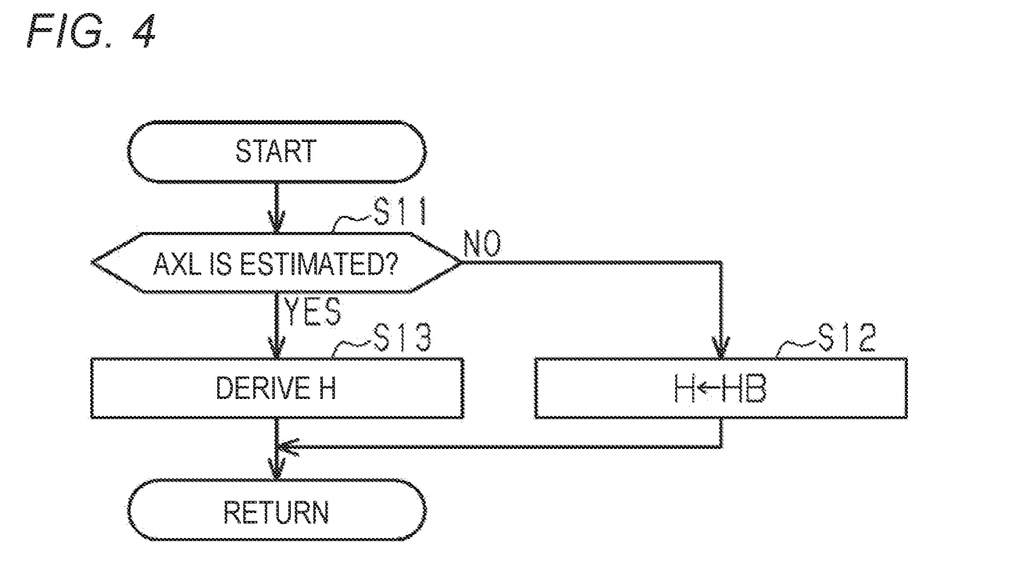
FIG. 4 is a flowchart for explaining a processing routine executed when deriving a gravitational center height of the vehicle.

Next, a processing routine executed by the gravitational center height derivation unit 52 will be described with reference to FIG. 4. This processing routine is repeatedly executed for every predetermined control cycle.

In this processing routine, in step S11, whether or not axle load AXL is estimated is determined. The axle load AXL is a weight applied to the suspensions 15f, 15r of vehicle 10, and refers to a mass on a spring. Therefore, if the loading amount of vehicle 10 can be acquired, axle load AXL can be estimated. For example, the axle load AXL can be estimated based on a product of the number of passengers of the vehicle 10 and an average weight. In a case where a seating sensor is mounted on the vehicle 10, the gravitational center height derivation unit 52 can grasp the number of passengers based on a detection signal of the seating sensor. Furthermore, in a case where an in-vehicle camera is mounted on the vehicle 10, the gravitational center height derivation unit 52 can acquire the number of passengers by analyzing the image imaged by the in-vehicle camera.

When determination is not made that the axle load AXL is estimated (S11: NO), the processing proceeds to the next step S12. In step S12, the reference gravitational center height HB is derived as the gravitational center height H. The reference gravitational center height HB is defined by the specifications of the vehicle 10, and is the gravitational center height H of the vehicle state to become a reference. The vehicle state to become a reference is, for example, a vehicle state in a case where two persons are in the front seats of the vehicle, the fuel tank is full, and no cargo is loaded. Then, the present processing routine is once terminated.

On the other hand, when determination is made the axle load AXL is estimated (step S11: YES), the processing proceeds to the next step S13. In step S13, the gravitational center height H is derived based on the estimation result of axle load AXL. For example, a larger value is derived for the gravitational center height H as the axle load AXL becomes heavier. When the gravitational center height H is derived, the present processing routine is once terminated.

Figure 5:
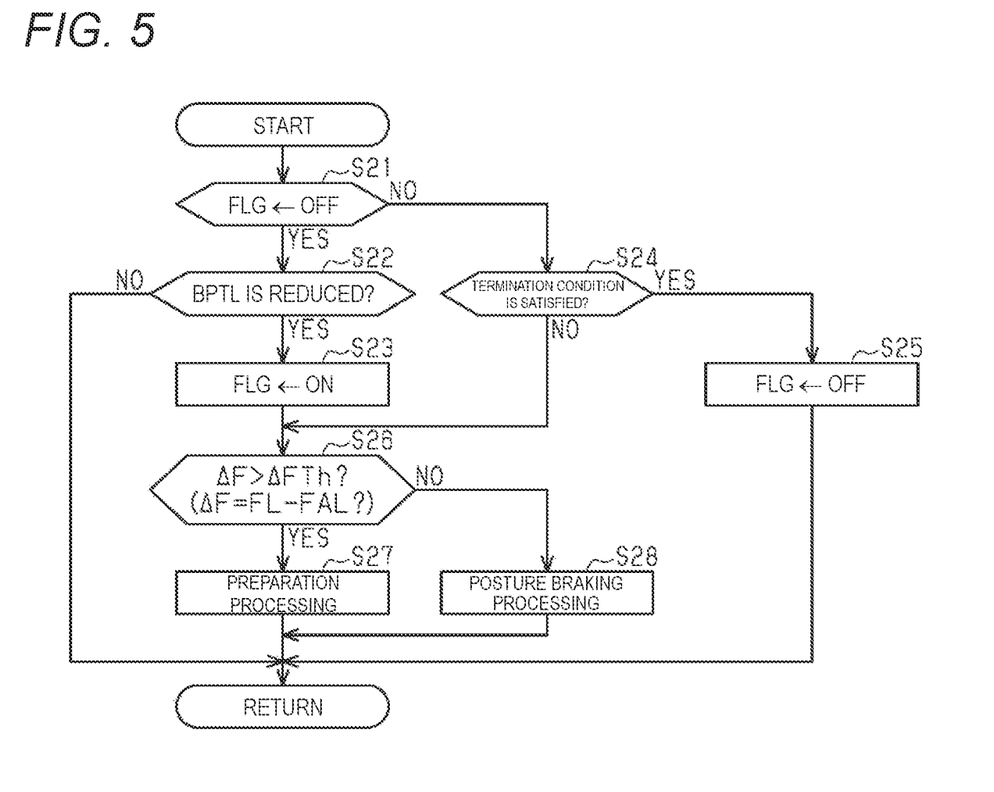
FIG. 5 is a flowchart for explaining a processing routine executed when adjusting the front wheel braking force and the rear wheel braking force.

Next, a processing routine executed by the braking control unit 51 will be described with reference to FIG. 5. This processing routine is repeatedly executed for every predetermined control cycle at the time of vehicle braking.

In this processing routine, in step S21, whether or not the control flag FLG is set to OFF is determined. The control flag FLG is a flag that is set to ON when a preparation processing or a posture braking processing to be described later is performed, and is set to OFF when neither the preparation processing nor the posture braking processing is performed. When the control flag FLG is set to OFF (step S21: YES), the processing proceeds to the next step S22. In step S22, whether or not the vehicle braking force BPTL is reduced is determined. In a case where the braking force BPTL is applied to the vehicle 10 by the braking operation from the driver, when the braking operation amount X is reduced, determination is made that the vehicle braking force BPTL is reduced. On the other hand, when the braking operation amount X is increased or the braking operation amount X is maintained, the braking operation amount X is not reduced, and thus determination is not made that the vehicle braking force BPTL is reduced. In addition, in a case where automatic braking is performed, when the required value of the vehicle braking force BPTL input from the control device for automatic driving to the braking control device 50 is reduced, determination is made that the vehicle braking force BPTL is reduced. On the other hand, when the required value is increased or the required value is maintained, determination is not made that the vehicle braking force BPTL is reduced.

Then, when determination is not made that the vehicle braking force BPTL is reduced (step S22: NO), this processing routine is once terminated. Then, when determination is made that the vehicle braking force BPTL is reduced (S22: YES), the processing proceeds to the next step S23. Then, in step S23, the control flag FLG is set to ON. Thereafter, the processing proceeds to step S26.

On the other hand, when the control flag FLG is set to ON (NO) in step S21, the processing proceeds to the next step S24. In step S24, whether or not a termination condition for the preparation processing or a posture braking processing is satisfied is determined. The braking control unit 51 determines that the termination condition is satisfied when at least one of stopping by the application of the braking force BPTL to the vehicle 10 and releasing of the application of the braking force BPTL to the vehicle 10 is satisfied. On the other hand, when determination is made that the termination condition is satisfied (step S24: YES), the processing proceeds to the next step S25. Then, in step S25, the control flag FLG is set to OFF. Thereafter, the present processing routine is once terminated. On the other hand, when determination is not made that the termination condition is satisfied in step S24 (NO), the processing proceeds to the next step S26.

In step S26, whether or not the force difference ΔF, which is a value obtained by subtracting the anti-lift force FAL from the lift force FL, which is the reduction amount ΔSW of the sprung load SW2 on the second wheel side, is larger than the difference determination value ΔFTh is determined. A value in which the lift force FL and the anti-lift force FAL can be regarded as being equal is set as the difference determination value ΔFTh. In the present embodiment, "0" is set as the difference determination value ΔFTh. When the vehicle 10 is traveling forward, the rear wheel side suppression force FAr corresponds to the anti-lift force FAL. When determination is made that the force difference ΔF is larger than the difference determination value ΔFTh (S26: YES), the processing proceeds to the next step S27.

In step S27, the preparation processing is performed. In the preparation processing, the braking actuator 22 is actuated so as to limit the reduction in the second braking force and adjust the first braking force such that the vehicle braking force BPTL becomes the required value of the vehicle braking force BPTL. In the preparation processing performed in the present embodiment, the second braking force is maintained. Then, the first braking force is reduced so that a state in which the vehicle braking force BPTL is equal to the required value is maintained even if the second braking force is maintained in this manner. Therefore, the reduction rate of the first braking force is larger than when the preparation processing is not performed. Note that when the vehicle 10 travels forward, the rear wheel 12 corresponds to the second wheel, and the front wheel 11 corresponds to the first wheel. Thus, the front wheel braking force BPf is reduced at a larger reduction rate than when the preparation processing is not performed while the rear wheel braking force BPr is maintained by performing the preparation processing. Then, the present processing routine is once terminated.

On the other hand, when determination is not made that the force difference ΔF is larger than the difference determination value ΔFTh in step S26 (NO), the processing proceeds to the next step S28. In step S28, the posture braking processing is performed. In the posture braking processing, the braking actuator 22 is actuated to adjust the second braking force so that the force difference ΔF falls within less than or equal to the difference determination value ΔFTh, and to adjust the first braking force so that the vehicle braking force BPTL becomes a required value of the vehicle braking force BPTL. In the posture braking processing, the second braking force is also reduced, unlike the preparation processing. Therefore, when the processing to be performed shifts from the preparation processing to the posture braking processing, the reduction rate of the first braking force decreases. Note that when the vehicle 10 travels forward, the rear wheel 12 corresponds to the second wheel, and the front wheel 11 corresponds to the first wheel. In the present embodiment, "0" is set as the difference determination value ΔFTh. Therefore, the rear wheel braking force BPr is reduced so that a state in which the reduction amount ΔSW of the sprung load SWr for the rear wheel 12 is equal to the rear wheel side suppression force FAr is maintained by performing the posture braking processing. Then, the present processing routine is once terminated.

Figure 6:
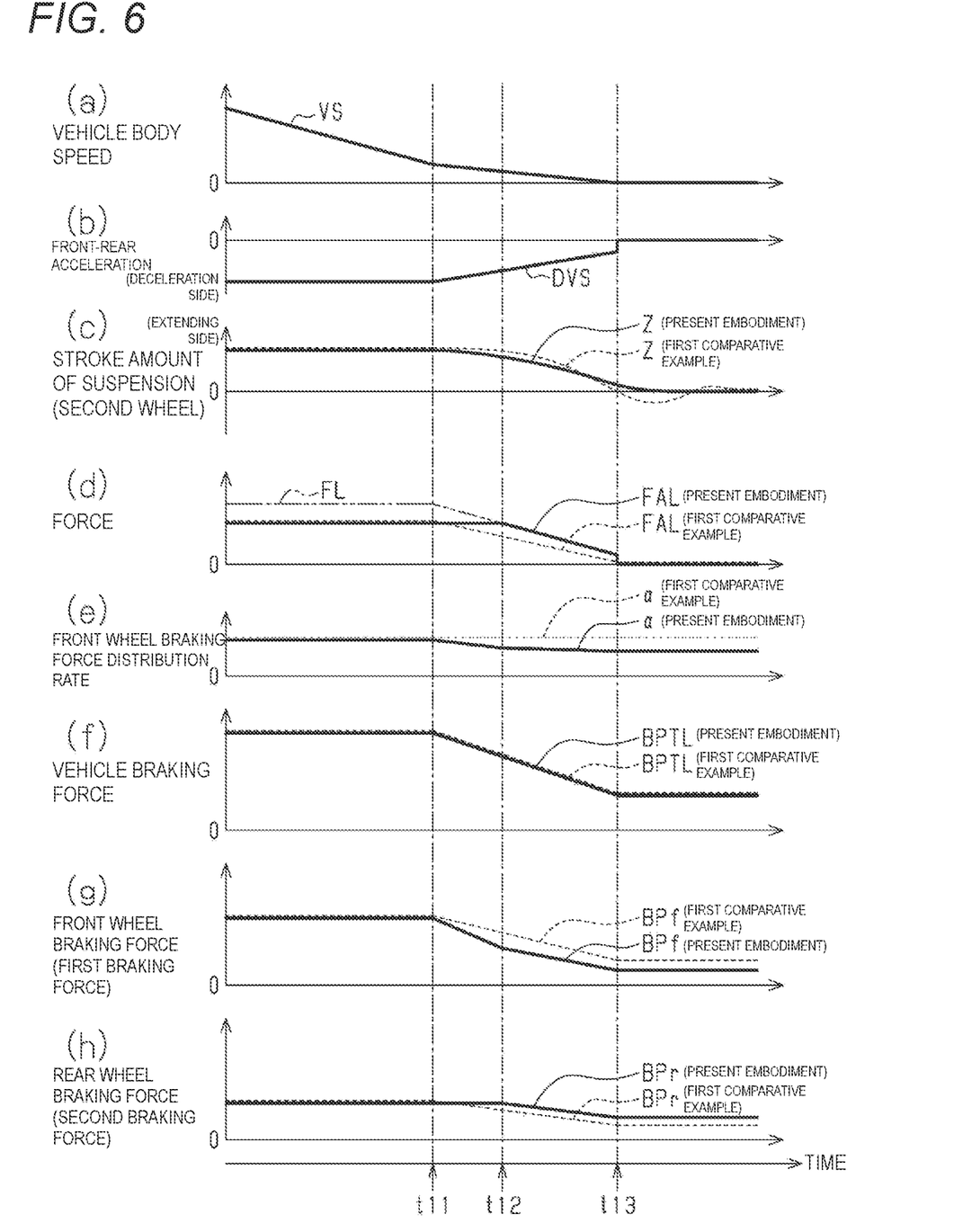
FIG. 6 depicts timing charts at the time of vehicle braking.

Next, the operation and effect of the present embodiment will be described with reference to FIG. 6. FIG. 6 illustrates a case where the braking force BPTL is applied to the vehicle 10 traveling forward to stop.

As illustrated in FIGS. 6(a) to 6(h), when the braking force BPTL is applied to the vehicle 10, the vehicle 10 decelerates, and thus the pitch angle AP increases due to the pitching motion of the vehicle body 14. Note that the sprung load SWf on the front wheel 11 side, which is the first wheel, is larger than when the vehicle 10 is not decelerating. Note that the sprung load SWr on the rear wheel 12 side, which is the second wheel, is smaller than when the vehicle 10 is not decelerating.

When the vehicle body speed VS decreases while the vehicle 10 is decelerating, the reduction in the vehicle braking force BPTL is started from timing t11 in the example illustrated in FIG. 6. Then, the absolute value of the front-rear acceleration DVS of the vehicle 10 decreases as the vehicle braking force BPTL reduces. The front-rear acceleration DVS is a value obtained by time-differentiating the vehicle body speed VS. When the front-rear acceleration DVS increases in this manner, the sprung load SWr on the rear wheel 12 side, which is the second wheel, increases. That is, as the vehicle braking force BPTL reduces, the reduction amount ΔSW of the sprung load SWr reduces.

At timing t11, the force difference ΔF between the lift force FL, which is the reduction amount ΔSW of the sprung load SWr, and the anti-lift force FAL is larger than the difference determination value ΔFTh. Therefore, the preparation processing is performed. In the preparation processing, the rear wheel braking force BPr is maintained. Then, the front wheel braking force BPf is reduced so that a state in which the vehicle braking force BPTL is equal to the required value is maintained. As a result, the front wheel braking force distribution ratio α, which is the ratio of the front wheel braking force BPf in the vehicle braking force BPTL, gradually decreases. Then, the force difference ΔF gradually decreases.

Then, when the force difference ΔF reaches the difference determination value ΔFTh at timing t12, the preparation processing is terminated and the posture braking processing is started. In the posture braking processing, the rear wheel braking force BPr is reduced so that the force difference ΔF is less than or equal to the difference determination value ΔFTh, that is, a state in which the lift force FL is equal to the anti-lift force FAL is maintained. Then, the front wheel braking force BPf is reduced so that a state in which the vehicle braking force BPTL is equal to the required value is maintained. As a result, the reduction rate of the front wheel braking force distribution ratio α becomes smaller than that during the execution of the preparation processing.

Then, at timing t13, the vehicle 10 stops in a state where the force difference ΔF is less than or equal to the difference determination value ΔFTh. Then, the reduction in the front wheel braking force BPf and the rear wheel braking force BPr is stopped. Furthermore, the front wheel braking force distribution ratio α is maintained.

Here, a first comparative example in which the front wheel braking force distribution ratio α is not changed even if the vehicle braking force BPTL is reduced will be considered. In FIG. 6(c), the transition of the stroke amount Z in the present embodiment is indicated by a solid line, and the transition of the stroke amount Z in the first comparative example is indicated by a broken line. In FIG. 6(d), the transition of the anti-lift force FAL in the present embodiment is indicated by a solid line, and the transition of the anti-lift force FAL in the first comparative example is indicated by a broken line. In FIG. 6(e), the transition of the front wheel braking force distribution ratio α in the present embodiment is indicated by a solid line, and the transition of the front wheel braking force distribution ratio α in the first comparative example is indicated by a broken line. In FIGS. 6(f) to 6(h), the transitions of the braking forces BPTL, BPf, and BPr in the present embodiment are indicated by solid lines, and the transitions of the braking forces BPTL, BPf, and BPr in the first comparative example are indicated by broken lines.

In the first comparative example, since the rear wheel braking force BPr is reduced without considering the force difference ΔF, the force difference ΔF is larger than the difference determination value ΔFTh at timing t13 to stop. Therefore, when the vehicle stops, the spring 151 of the suspension 15r for the rear wheel 12 contracts. Since the change rate of the stroke amount Z at this time is large, the spring 151 repeats expansion and contraction until the stroke amount Z converges to "0".

On the other hand, in the present embodiment, at timing t13 at which the vehicle stops, the force difference ΔF is less than or equal to the difference determination value ΔFTh. Therefore, when the vehicle stops, the stroke amount Z gradually changes toward "0". As a result, occurrence of repetition of expansion and contraction of the spring 151 is suppressed. As a result, the change rate of the posture of the vehicle body 14 at the time of stopping can be reduced, and hence the comfort of the occupant of the vehicle 10 can be improved.

In addition, in a case where the vehicle braking force BPTL is reduced without changing the front wheel braking force distribution ratio α as in the first comparative example, an example of a method of further reducing the front-rear acceleration DVS immediately before stopping includes further reducing the vehicle braking force BPTL immediately before stopping. In this case, although the change rate of the pitch angle AP accompanying the stopping can be reduced, the braking distance of the vehicle 10 may be increased.

In this regard, in the present embodiment, the change rate of the posture of the vehicle body 14 at the time of stopping can be reduced without further reducing the vehicle braking force BPTL immediately before stopping. That is, since the extension of the braking distance can be suppressed, the degradation of the comfort of the occupant can be suppressed.

In the preparation processing and the posture braking processing performed in the present embodiment, the front wheel braking force BPf is adjusted so that the vehicle braking force BPTL becomes the required value. Therefore, the front-rear acceleration DVS of the vehicle 10 can be suppressed from deviating from the target value due to the execution of the preparation processing and the posture braking processing.

Furthermore, when the vehicle braking force BPTL is reduced, a second comparative example in which the front wheel braking force BPf is reduced while maintaining the rear wheel braking force BPr until the vehicle stops and a third comparative example in which the rear wheel braking force BPr is reduced while maintaining the front wheel braking force BPf until the vehicle stops are considered.

In a second comparative example, even when the sprung load SWr on the rear wheel 12 side is increased due to the reduction in the front-rear acceleration Gx of the vehicle 10, the rear wheel braking force BPr is not reduced and hence the anti-lift force FAL is maintained. Therefore, the vehicle 10 stops in a state where the anti-lift force FAL is larger than the lift force FL. In addition, since the front wheel braking force BPf is greatly reduced by the amount the rear wheel braking force BPr is not reduced, the vehicle 10 stops in a state where the anti-dive force FAD is greatly reduced. Thus, the vehicle 10 stops in a state where the anti-dive force FAD is smaller than the dive force FD. As a result, the reduction rate of the pitch angle AP of the vehicle 10 at the time of stopping increases. Since the reduction rate of the pitch angle AP is large, the pitch angle AP is repeatedly increased and decreased, and then the fluctuation of the pitch angle AP is stopped.

In a third comparative example, even when the sprung load SWf on the front wheel 11 side is reduced due to the reduction in the front-rear acceleration Gx of the vehicle 10, the front wheel braking force BPf is not reduced and hence the anti-dive force FAD is maintained. Therefore, the vehicle 10 stops in a state where the anti-dive force FAD is larger than the dive force FD. In addition, since the rear wheel braking force BPr is greatly reduced by the amount the front wheel braking force BPf is not reduced, the vehicle 10 stops in a state where the anti-lift force FAL is greatly reduced. Thus, the vehicle 10 stops in a state where the anti-lift force FAL is smaller than the lift force FL. As a result, the vehicle body 14 is displaced upward when the vehicle stops. When both the force difference ΔF, which is the difference between the lift force FL and the anti-lift force FAL, and the difference between the anti-dive force FAD and the dive force FD, are large at the time of stopping, the vertical movement of the vehicle body 14 is repeated, and then the vertical movement of the vehicle body 14 is stopped.

On the other hand, in the present embodiment, the vehicle 10 can be stopped in a state where the force difference ΔF is less than or equal to the difference determination value ΔFTh. Therefore, according to the present embodiment, as compared with the cases of the second comparative example and the third comparative example, the change in the posture of the vehicle 10 at the time of stopping can be suppressed, and furthermore, the comfort of the occupant of the vehicle 10 can be improved.

In a case where the vehicle braking force BPTL is reduced when the vehicle 10 travels backward, the front wheel side suppression force FAf is derived as the anti-lift force FAL, and the reduction amount ΔSW of the sprung load SWf on the front wheel 11 side, which is the second wheel, is derived as the lift force FL. While the force difference ΔF, which is the difference between the lift force FL and the anti-lift force FAL, is larger than the difference determination value ΔFTh, the front wheel braking force BPf is maintained and the rear wheel braking force BPr is reduced by the execution of the preparation processing. Then, when the force difference ΔF becomes less than or equal to the difference determination value ΔFTh, the preparation processing is terminated and the posture braking processing is started. Then, the front wheel braking force BPf and the rear wheel braking force BPr are respectively reduced. Then, when the vehicle 10 is stopped or the vehicle braking is released, the posture braking processing is terminated.

The present embodiment can be modified and implemented as follows. The present embodiment and the following modified examples can be implemented in combination with each other within a technically consistent scope.

A value larger than "0" may be set as the difference determination value ΔFTh as long as it is a value that can determine that there is barely any difference between the lift force FL and the anti-lift force FAL.

In the preparation processing, the second braking force may not be maintained as long as the reduction in the second braking force can be restricted so that the force difference ΔF, which is the difference between the lift force FL and the anti-lift force FAL, can be reduced. That is, the second braking force may be reduced even during the preparation processing. However, the reduction rate of the second braking force during the preparation processing is smaller than the reduction rate of the second braking force in the first comparative example indicated by a broken line in FIG. 6(h).

Furthermore, in the preparation processing, the force difference ΔF may be reduced by increasing the second braking force within a range the first braking force does not become "0". As a result, a state in which the force difference ΔF is less than or equal to the difference determination value ΔFTh can be realized earlier than in the case of the above embodiment. That is, the transition from the preparation processing to the posture braking processing can be performed early.

When the force difference ΔF becomes less than or equal to the difference determination value ΔFTh in the processing in which both the first braking force and the second braking force are reduced accompanying the reduction in the vehicle braking force BPTL, the preparation processing may not be performed. In this case, the posture braking processing may be started when the force difference ΔF becomes less than or equal to the difference determination value ΔFTh in the processing in which both the first braking force and the second braking force are reduced accompanying the reduction in the vehicle braking force BPTL.

In deriving the gravitational center height H, a difference between the lift force FL and the anti-lift force FAL and a difference between the dive force FD and the anti-dive force FAD may be used.

The gravitational center height H may be fixed at the reference gravitational center height HB.

In the above embodiment, the case where the frictional braking force for actuating the braking mechanism 13 is applied to the front wheel 11 and the rear wheel 12 has been described. However, the braking control device 50 can also be applied in a case where regenerative braking force is applied to the front wheel 11 and the rear wheel 12.

As long as frictional braking force can be applied to the wheels 11 and 12, the braking mechanism 13 may have a function different from the configuration described in the above embodiment. For example, the braking mechanism 13 may be a mechanism that presses the friction material 133 against the rotating body 132 with a force corresponding to the driving amount of the electric motor without including the wheel cylinder 131. As such a braking mechanism 13, for example, Japanese Unexamined Patent Application Publication No. 2017-100507 can be exemplified.

The invention claimed is:

1. A braking control device applied to a vehicle including a braking device that adjusts a braking force applied to a front wheel and a braking force applied to a rear wheel, in which when the braking force is applied to a first wheel located on a front side in a vehicle advancing direction among the front wheel and the rear wheel, an anti-dive force that is a force that displaces a front portion of a vehicle body in the vehicle advancing direction upward is generated, and when the braking force is applied to a second wheel located on a rear side in the vehicle advancing direction, an anti-lift force that is a force that displaces a rear portion of the vehicle body in the vehicle advancing direction downward is generated; the braking control device comprising:

a load reduction amount derivation unit configured to derive a load reduction amount, which is a reduction amount of an input load from a reference input load due to application of the braking force to the vehicle, such that the load reduction amount increases as a reduction amount of a vehicle braking force increases, wherein the vehicle braking force is the braking force applied to the vehicle, the input load is a load input from the vehicle body to a suspension interposed between the vehicle body and the second wheel, and the reference input load is the input load when the braking force is not applied to the vehicle;

an anti-force derivation unit configured to derive the anti-lift force such that the anti-lift force increases as a second braking force, which is a braking force applied to the second wheel, increases; and a braking control unit configured to perform a posture braking process of adjusting the second braking force such that a difference between the load reduction amount and the anti-lift force is less than or equal to a difference determination value, and adjusting a first braking force, which is a braking force applied to the first wheel so that the vehicle braking force becomes a required value of the vehicle braking force when the vehicle braking force is reduced under a situation where the vehicle is decelerated by application of the braking force.

2. The braking control device for the vehicle according to claim 1, wherein in a case where the vehicle braking force is reduced under a situation where the vehicle is decelerated by application of a braking force, the braking control unit performs a preparation processing of restricting reduction of the second braking force and adjusting the first braking force so that the vehicle braking force becomes the required value when the difference is larger than the difference determination value, and performs the posture braking processing when the difference is less than or equal to the difference determination value.

3. The braking control device for the vehicle according to claim 2, wherein "0" is set as the difference determination value.

4. The braking control device for the vehicle according to claim 1, wherein "0" is set as the difference determination value.

* * * * *